DIFUNCTION ROOT EXTRACTOR CIRCUITS

Filed June 27, 1955 3 Sheets-Sheet 1

INVENTOR.
FLOYD G. STEELE
BY
Seymour M. Rosenberg
ATTORNEY

Sept. 29, 1959 F. G. STEELE 2,906,457

DIFUNCTION ROOT EXTRACTOR CIRCUITS

Filed June 27, 1955 3 Sheets-Sheet 2

INVENTOR.
FLOYD G. STEELE

BY
Seymour M. Rosenberg
ATTORNEY

Sept. 29, 1959 F. G. STEELE 2,906,457

DIFUNCTION ROOT EXTRACTOR CIRCUITS

Filed June 27, 1955 3 Sheets-Sheet 3

INVENTOR
FLOYD G. STEELE
BY
Seymour M. Rosenberg
ATTORNEY

United States Patent Office 2,906,457

Patented Sept. 29, 1959

2,906,457

DIFUNCTION ROOT EXTRACTOR CIRCUITS

Floyd G. Steele, La Jolla, Calif., assignor to Digital Control Systems, Inc., La Jolla, Calif.

Application June 27, 1955, Serial No. 518,191

19 Claims. (Cl. 235—158)

This invention relates to difunction root extractor circuits and more particularly to electronic circuits which are operative to generate a difunction output signal non-numerically representative of a predetermined root of a function of one or more quantities respectively represented by a corresponding number of applied difunction input signal trains.

Relatively recent developments in the field of digital computation have brought forth a new class of electronic digital computing elements in which operations are performed on and in response to what has come to be termed difunction signal trains, as contrasted with the conventional digital computing machines which operate upon signals representing weighted binary digits. As will be disclosed in more detail hereinafter, the term difunction signal train refers to a train of signals each having either a first value representing a first algebraic number or a second value representing a second algebraic number, and is readily distinguished from signal trains conventional in prior art computer systems in that all of the signals in the difunction signal train having the same value represent identical numbers.

For example, if it is assumed that the algebraic numbers in a difunction signal train are plus one and minus one, then each of the signals in the train individually represents either a plus one or a minus one, depending on the value of the signal. Stated differently, in a difunction signal train the individual signals are unweighted, each signal having equal significance with every other signal. Accordingly, a difunction signal train may be termed a non-numerical representation of the quantity which the train represents, since the signals are not weighted according to any number system, or in other words, have no radix as this term is customarily employed.

The representation of physical or mathematical quantities by difunction signal trains has been found to be extremely useful both in the solution of mathematical equations and in the field of automatic control. Some examples of the application of difunction representation to the solution of mathematical equations may be found in copending U.S. patent application Serial No. 388,780, filed by the same inventor on October 28, 1953, for "Electronic Digital Differential Analyzer," wherein difunction signal trains are employed for communicating between the integrators of a digital differential analyzer, and in copending U.S. patent application Serial No. 510,673, filed May 24, 1955 by the same inventor for "Difunction Computing Elements." Similarly, copending U.S. patent application Serial No. 311,609, filed September 26, 1952 by the same inventor, for "Computer and Indicator System," discloses the application of difunction representation to the field of process control and also discloses electronic computing circuits which operate directly to perform mathematical operations by combining difunction signals.

The foregoing patent applications disclose structures for adding, subtracting, multiplying, dividing and integrating difunction signal trains. However, there has remained a need for a relatively simple circuit which is capable of performing the operation of root extraction upon a function represented by one or more applied input difunction signal trains.

According to the present invention there are provided difunction root extractor circuits which are operative to generate a difunction output signal non-numerically representative of a predetermined root of a function of one or more quantities respectively represented by a corresponding number of applied input difunction signal trains. In accordance with the fundamental concept of the invention, all of the difunction root extractor circuits herein disclosed employ as their basic elements a difunction multiplier-divider circuit of the type disclosed in the aforementioned U.S. patent application Ser. No. 510,673, and a feedback loop which intercouples the output terminal of the multiplier-divider circuit with a predetermined one of its input terminals.

More specifically, in their most general form the difunction multiplier-dividers utilized in the root extractor circuits of the invention include a divisor input terminal, a dividend input terminal and a multiplier input terminal for receiving three input difunction signal trains and are operative to generate an output difunction signal train non-numerically representative of the quotient of the quantities represented by the trains applied to the dividend and divisor input terminals, multiplied by the quantity represented by the difunction train applied to multiplier input terminal. In accordance with the invention, the root extractor circuits hereindisclosed employ a feedback loop for coupling the output circuit of the multiplier-divider back to the divisor input terminal, the particular form of the feedback loop being determined by the function whose root or roots are to be extracted.

The difunction root extractor circuits of the invention may be classified broadly in two categories, the first of which includes those which are capable of extracting any predetermined root of either a single input difunction signal train or of the product of a pair of input difunction signal trains. The root extractor circuits in this category employ one or more of what will hereinafter be termed a basic square root extractor circuit in which the feedback loop merely applies the output difunction train to the divisor input terminal. As will be disclosed in detail hereinbelow, by cascading a plurality M of these square root extractors and arranging additional feedback connections between their output circuits and the multiplier input terminals of the preceeding circuits, it is possible to obtain any root up to and including the $2^M$th root of the quantity represented by an applied input difunction signal train.

The root extractor circuits of the other category, on the other hand, employ more complex feedback loops which are operative to combine the difunction output signal from the root extractor circuit with one or more additional difunction signals to produce a resultant difunction signal which is applied to the divisor input terminal. Among the root extractor circuits which fall into this category are circuits capable of solving polynomial equations for their roots.

It is, therefore, an object of the invention to provide difunction root extractor circuits which are operative to generate electrical signals representative of any predetermined root of a function of one or more quantities respectively represented by difunction input signal trains.

Another object of the invention is to provide difunction root extractor circuits which are operative to generate difunction output signal trains non-numerically representative of predetermined roots of functions of one or more quantities respectively represented by applied difunction input signal trains.

A further object of the invention is to provide a difunction square root extractor circuit which is operative to generate a difunction output signal non-numerically representative of the square root of the quantity represented by a single applied difunction signal train.

It is also an object of the invention to provide a difunction square root extractor circuit which is operative to generate a difunction output signal non-numerically representative of the square root of the product of the quantities represented by two applied difunction signal trains.

Still another object of the invention is to provide difunction root extractor circuits which are operative to generate output difunction signal trains representative of the roots of polynomial equations represented by a plurality of applied difunction input signal trains.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Before proceeding with the detailed description of the difunction root extractors of the invention, it is considered appropriate first to define more fully the terminology employed in difunction representation and to illustrate the mathematical and physical significance of difunction signals as they are utilized to convey intelligence information. Thereafter the structure and operation of the difunction root extractors of the invention will be disclosed.

As used in this specification, the term difunction signal train refers to a train of signals each having either a first value representing a first algebraic number $N_1$ or a second value representing a second algebraic number $N_2$. A difunction signal train may be readily distinguished from signal trains conventional in prior art computer systems in that all of the signals in the difunction signal train having the same value represent identical numbers, while in conventional signal trains signals having the same value represent different numbers depending upon the number system employed and the relative position or weighting of the signal in the train. For example in a binary number system signal train progressing from least significant digit first, successive signals represent the numbers 1 or 0, 2 or 0, 4 or 0, . . . $2^n$ or 0. On the other hand, in a difunction signal train in which the algebraic numbers are 1 and $-1$, all of the signals represent either 1 or $-1$ depending on the value of the signal. Stated differently, a difunction signal train differs from conventional numerical signal trains in that the signals of the difunction train are unweighted, each signal having equal significance with every other signal. Therefore, a difunction signal train may be termed a non-numerical representation, since the signals are not weighted according to any number system.

Difunction signal trains may take numerous forms the most common of which are, according to this invention, a bilevel electrical signal train, a train of bipolar electrical pulses, and a train of unipolar pulses in which the presence or absence of a pulse in an interval indicates the value of the signal. In addition, the algebraic numbers represented by the signals of a difunction signal train may both have the same sign, may have different signs, or may include one number which is zero. For purposes of clarity and simplicity, the following discussion of difunction signal trains (and of specific embodiments of this invention) will be limited to a normalized system for a bilevel electrical signal train in which each signal has a predetermined time duration or period T and either a relatively high level representing the algebraic number $+1$ or a relatively low level representing the algebraic number $-1$.

Figure 1:
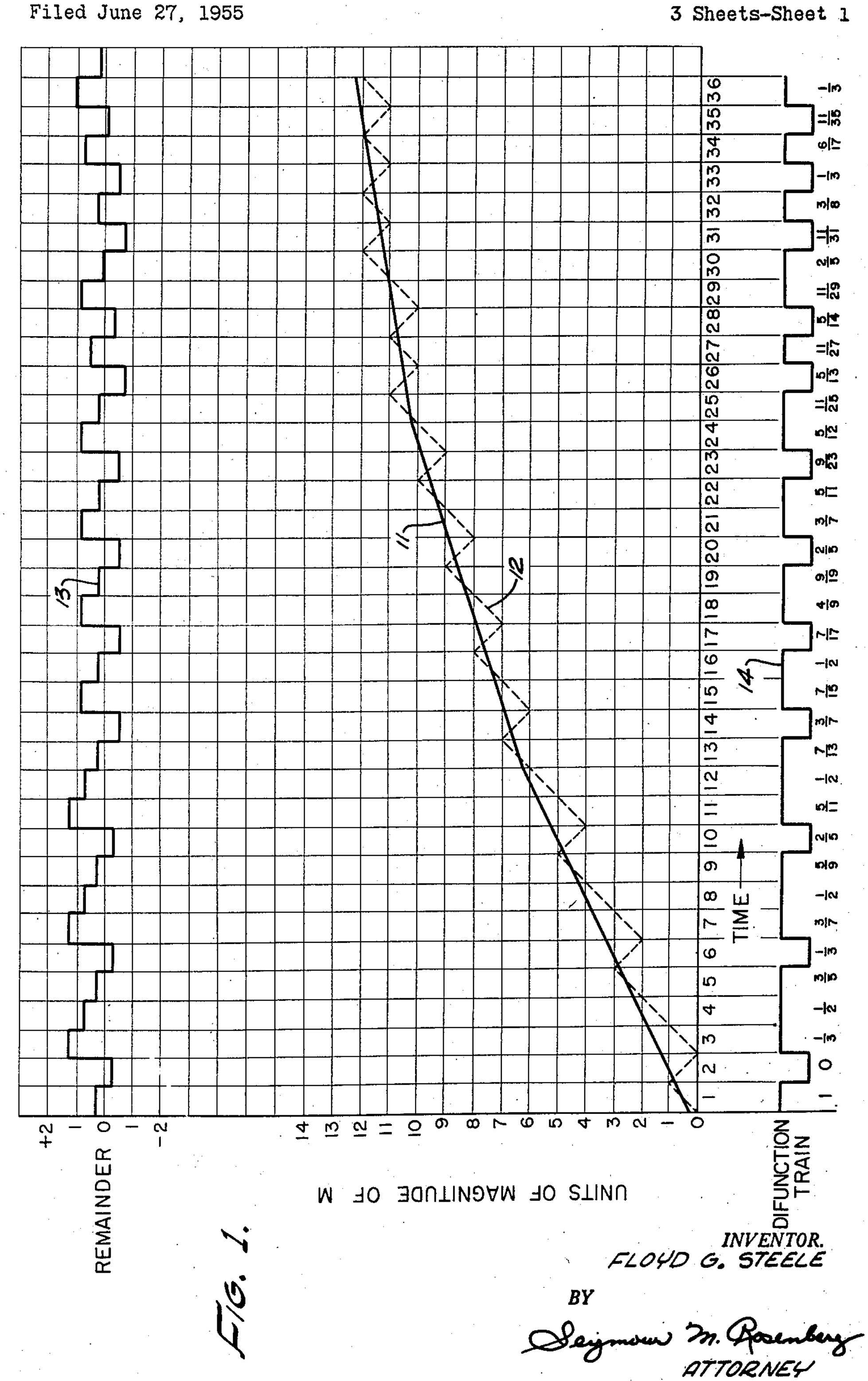
Fig. 1 is a composite diagram including a curve representing a function of time and a curve illustrating the difunction representation thereof.

In order to present more fully the theory and application of difunction signal trains, reference is now made to Fig. 1 which is a composite graphical representation of the variations of a variable quantity to be measured and the equivalent difunction signals. More particularly, there is shown in Fig. 1 a curve generally designated 11 representing the variations in units of magnitude with respect to time of a variable quantity M to be measured. It can readily be seen that curve 11 has slopes of ½, ⅓, and ⅙ for the first, second and third sets, respectively, of twelve units of time T. In addition, it can readily be observed that the average slope of curve 11 over the entire thirty-six units of time T shown in the drawing is equal to ⅓. It will now be demonstrated how the variations in quantity M may be represented by a difunction signal train and the significance of the train with respect to the properties of these variations.

As stated above, it will be assumed that the difunction signal train is established in a normalized system in which each difunction signal represents either the algebraic number $+1$ or the algebraic number $-1$. In other words, with respect to curve 11, each difunction signal can represent either a positive increment of one unit of magnitude per unit of time or a negative increment of one unit of magnitude per unit of time. Obviously, since curve 11 does not vary in this form of unital variation, a single difunction signal can only approximate the variations in the quantity M. However, if it is assumed for the moment, that the absolute magnitude of the maximum variation in quantity M is equal to one unit of magnitude per unit of time T, the single difunction signal will approximate the variation in quantity M per each unit of time to an extremely close degree. In fact, under the assumed conditions, the difunction signal will represent the most significant digit of the actual variation. Accordingly, if the system for generating the difunction signal train took into account the remainder, or in other words the difference between the actual variation experienced by quantity M and the unit variation represented by the difunction signal, and generated the succeeding difunction signal in a manner to reduce the remainder towards zero, this accuracy of the difunction signal train in representing the variations in quantity M would at least be maintained.

The concepts set forth in the preceding paragraph can be restated in terms of simple mathematics. Assume that at an arbitrary point in time designated the beginning of the first time interval of Figure 1, the system has an initial remainder $R_0$. Assume also that the system generates a difunction signal $\not{p}_1$ at this instant. Then.

by definition, the remainder $R_1$ at the end of the first interval may be written as:

$$R_1=\Delta M_1+R_0-\not{D}_1 \qquad (1)$$

where $\Delta M_1$ represents the change in the variable quantity M during the first interval.

At the end of the first interval, a second difunction signal $\not{D}_2$ is generated and the new remainder $R_2$ at the end of the second interval is equal to:

$$R_2=R_1+\Delta M_2-\not{D}_2 \qquad (2)$$

Generalizing Equation 2 for a remainder $R_n$ at the end of the $n^{th}$ interval results in:

$$R_n=R_{n-1}+\Delta M_n-\not{D}_n \qquad (3)$$

or, substituting for $R_{n-1}$ the values that would be obtained in each of the succeeding equations, $$R_n=R_0+\sum_1^n \Delta M_i-\sum_1^n \not{D}_i \qquad (4)$$

$$=R_0+\Delta M_{(0-n)}-\sum_1^n \not{D}_i \qquad (5)$$

From Equation 5, it is readily observed that under the assumed initial conditions the summation of the difunction signals generated over $n$ units of time T will approximate the value of the total change $\Delta M_{(0-n)}$ of variable quantity M for time $n$T. In addition it is also already observed from Equation 3 that the change in remainder during any interval can never exceed the quantity $$(\Delta M_n-D_n)$$

which, under the assumed conditions, is limited to $\pm 2$ units of magnitude. Accordingly, the maximum magnitude of the remainder at the end of any time interval is equal to 2 units.

Reference is again made to Figure 1 to illustrate how the concepts and equations set forth above are applied to a difunction signal train generating system in order to represent the variable quantity M. As shown in the drawing, quantity M has an initial slope of one-half while remainder $R_0$ has an initial value of one-quarter. Assume also that the difunction signal starts from zero and that the first difunction signal to be generated is a +1. This first difunction signal $\not{D}_1$ is indicated by that portion of dotted line 12 of Figure 1 which occurs during the first time interval.

At the end of the first time interval, the difunction signal train, represented by line 12, has a value of +1 while the variable M, represented by curve 11, has a value of +¾. Accordingly, from Equation 1, remainder $R_1$ is equal to −¼, as indicated by the graphical remainder representation, generally designated 13, during the second time interval, which represents the difference between curve 11 and difunction line 12 at the end of each interval. Since the remainder is negative, the system will generate a −1 difunction signal in order to drive the next remainder towards zero.

It should be pointed out that although the system is designed to generate a difunction signal which drives the remainder towards zero, and, therefore, according to Equation 5, makes the summation of the difunction signals over the entire interval of time equal to the magnitude of the total change in the variable quantity at the end of the interval, the difunction signal generated can be only ±1. Accordingly, there will be a number of instances in which the absolute magnitude of the remainder at the end of an interval will be greater than the absolute magnitude of the remainder at the end of the preceding interval. As will be pointed out more fully below, this limitation is inherent in the difunction system and is required in order to make the rate of change represented by the difunction signal train closely approximate the rate of change of variable quantity M.

Returning now to Figure 1, it is clear that difunction signal $\not{D}_2$ will be a −1, since remainder $R_1$ is negative.

Accordingly, as shown in the drawing and as represented by Equation 2, remainder $R_2$ at the end of the second interval will be equal to $$R_2+\Delta N_2-\not{D}_2=-1/4+1/2-(-1)=1\tfrac{1}{4}$$

Therefore difunction signal $\not{D}_3$ will be a +1 and the remainder $R_3$ will be equal to $$R_2+\Delta M_2-\not{D}_3=1\tfrac{1}{4}+\tfrac{1}{2}-1=+\tfrac{3}{4}$$

Similarly signal $\not{D}_4$ and remainder $R_4$ are +1 and +¼, respectively; signal $\not{D}_5$ and remainder $R_5$ are +1 and −¼, respectively; and signal $\not{D}_6$ and remainder $R_6$ are −1 and +1¼, respectively.

At this point, namely at the end of the sixth time interval, difunction signal $\not{D}_6$ and remainder $R_6$ are identical with difunction signal $\not{D}_2$ and remainder $R_2$. Accordingly, since curve 11 representing quantity M has been chosen to have a constant slope of +½, the patterns of difunction signals and remainders will be repeated. In other words, difunction signals $\not{D}_7$ through $\not{D}_{10}$ are identical to difunction signals $\not{D}_3$ through $\not{D}_6$, respectively, and remainders $R_7$ through $R_{10}$ are identical to remainders $R_3$ through $R_6$, respectively. If the slope of curve 11 were to remain constant at +½, the system would continue to generate this same repetitive pattern of three +1's and one −1. However for the curve 11 shown in the drawing the system will continue to generate this same repetitive pattern until the end of the twelfth time interval at which time ΔM changes from +½ to +⅓.

Consider now the relative values of curve 11, difunction train 12 and remainder $R_{12}$ at the end of the twelfth interval. As shown in the drawing, quantity M is at a value of +6¼, difunction train 12 is at a value of +6 and remainder $R_{12}$ is equal to +¼. Accordingly, the system will generate a difunction signal $\not{D}_{13}$ equal to +1 and remainder $R_{13}$, from Equation 3, will be equal to $R_{12}+\Delta M_{12}-\not{D}_{12}=+\tfrac{1}{4}+\tfrac{1}{3}-1=-\tfrac{5}{12}$, as represented by train 13. Difunction $\not{D}_{14}$ is, therefore, equal to −1 and remainder $R_{14}$ is equal to $-\tfrac{5}{12}+\tfrac{1}{3}+1=+\tfrac{11}{12}$. Similarly, difunction signal $D_{15}$ is equal to +1 and remainder $R_{15}$ is equal to +¼.

Accordingly, at the end of the fifteenth interval, difunction signal $\not{D}_{15}$ and remainder $R_{15}$ are identical with difunction signal $\not{D}_{12}$ and remainder $R_{12}$, respectively. Since the slope of curve 11 remains constant at +⅓ for the next nine intervals, namely intervals 16 through 24, the patterns of difunction signals and remainders during this period will be identical with the patterns during the thirteenth through fifteenth intervals. In other words, the pattern of difunction signals will progress in the order +1, −1 and +1, while the pattern of the remainders will progress in the order $-\tfrac{5}{12}$, $+\tfrac{11}{12}$, +¼.

At the end of the twenty-fourth interval, the difunction train 12 is at a value of +10, quantity M, as represented by curve 11 is at a value of +10¼, and the remainder is +¼. Accordingly, difunction signal $\not{D}_{25}$ is +1 and remainder $R_{25}$ is equal to $\tfrac{1}{4}+\tfrac{1}{6}-1=-\tfrac{7}{12}$. Similarly, difunction signal $\not{D}_{26}$ and remainder $R_{26}$ are equal to −1 and $+\tfrac{7}{12}$, respectively; while difunction signal $\not{D}_{27}$ and remainder $R_{27}$ are equal to +1 and −¼, respectively. The remaining values for the difunction signals and the remainders should be readily ascertainable in the manner set forth above, and are therefore, merely tabulated below:

| Interval | Difunction | Remainder |
|---|---|---|
| 28 | −1 | $+\tfrac{11}{12}$ |
| 29 | +1 | $+\tfrac{1}{12}$ |
| 30 | +1 | −¾ |
| 31 | −1 | $+\tfrac{5}{12}$ |
| 32 | +1 | $-\tfrac{5}{12}$ |
| 33 | −1 | +¾ |
| 34 | +1 | $-\tfrac{1}{12}$ |
| 35 | −1 | $+1\tfrac{1}{12}$ |
| 36 | +1 | +¼ |

Consider now the difunction signal train generated by the system in following curve 11 representing the variations in quantity M. It will be recalled from Equation 5 that the summation of the difunction train, as represented by line 12, will closely approximate the value of the variable quantity M, as represented by curve 11, and will never differ from the total change in quantity M by more than an absolute magnitude of two units. This statement is clearly borne out by remainder curve 13 of Figure 1. An even more significant result is obtained if both sides of Equation 5 are divided through by $n$T and the initial condition $$\frac{R_0}{nT}$$

is subtracted from both sides, one obtains:

$$\frac{R_n-R_0}{nT}=\frac{M_n}{nT}-\frac{\sum_1^n \not{p}_i}{nT}=(A_v\Delta M)_n-(A_v\not{p}_i)_n \quad (6)$$

where $(A_v\Delta M)_n$ signifies the average rate of change of variable quantity M during $n$T intervals and $(A_v\not{p}_i)_n$ signifies the average value of the difunction signal train during the same number of intervals. Assuming a value of T equal to unity, therefore, signifies that the average value of the difunction signal train approximates the average slope of the variable M, the maximum difference between these averages being $$\pm\frac{4}{nT}$$

owing to the fact that each of remainders $R_0$ and $R_n$ has a maximum value of $\pm 2$, as previously set forth. Obviously, as the sampling interval $n$T is increased, the maximum error in the difunction average decreases until the error is essentially insignificant.

Furthermore, rewriting Equation 5 for $m$T intervals, one obtains:

$$R_m=R_0+\Delta M_{(o-m)}-\sum_1^m \not{p}_i \quad (7)$$

and subtracting Equation 7 from Equation 5 yields:

$$R_n-R_m=\Delta M_{(o-n)}-\Delta M_{(o-m)}-\sum_1^n \not{p}_i$$

$$-\sum_1^m \not{p}_i=\Delta M_{(m-n)}-\sum_{m+1}^n \not{p}_i \quad (8)$$

Dividing Equation 8 through by the number of time intervals represented, namely $(n-m)$T, yields:

$$\frac{R_n-R_m}{(n-m)T}=\frac{M_n-M_m}{(n-m)T}-\frac{\sum_{m+1}^n D_i}{(n-m)T}$$
$$=(A_v\Delta M)_{n-m}-(A\not{p}_i)_{n-m} \quad (9)$$

where $(A_v\Delta M)_{n-m}$ signifies the average rate of change of variable quantity M between interval $m$T and interval $n$T, and $(A_v\not{p}_i)_{n-m}$ signifies the average value of the difunction signal train during the same intervals. In this instance, the maximum value of the error $$\frac{R_n-R_m}{(n-m)T} \text{ is equal to } \pm\frac{4}{n-m}$$

Reference is again made to Fig. 1 to illustrate the applicability of Equations 6 and 9 to the average rate of change of quantity M illustrated by curve 11. As shown in the drawing, quantity M progressed from an initial value of $+\frac{1}{4}$ to a final value of $+12\frac{1}{4}$ in 36 intervals. Therefore the average rate of change of quantity M, or the average slope of curve 11, during the entire period is equal to $+\frac{12}{36}$ or $+\frac{1}{3}$. During the same period the difunction signal train included 24 +1 signals and 12 −1 signals. Therefore the average value represented by the difunction signal train is equal to $$\frac{+24-12}{36} \text{ or } +\frac{12}{36} \text{ or } +\frac{1}{3}$$

Similarly, at the end of twenty-four time intervals, quantity M has attained the value of $+10\frac{1}{4}$, or a net average change of $+\frac{5}{12}$ while the average value of the difunction signal train is $$\frac{+17-7}{24} \text{ or } +\frac{5}{12}$$

It is thus seen that at the selected points, the average value of the difunction signal train is exactly equal to the average rate of change of quantity M over the intervals between the starting point and the selected points. In other words, at the selected points Equation 6 is fully satisfied with the remainder $R_n$ being exactly equal to the initial remainder $R_0$.

Consider now the applicability of Equation 9 to the drawings, utilizing the values established at the points specified in the preceding paragraph with $n$ equal to 36 and $m$ equal to 24. From the drawing the average rate of change of quantity M between the specified points is $+\frac{1}{6}$. On the other hand, the average rate of change indicated by the difunction signal train is equal to $$\frac{+7-5}{12} \text{ or } +\frac{1}{6}$$

Similarly, choosing $n$ as 24 and $m$ as 12, the average slope of quantity M is $+\frac{1}{3}$, while the average value of the difunction signal train during the interval is $$\frac{+8-4}{12} \text{ or } +\frac{1}{3}$$

It is thus seen that, between the selected points, the average value of the difunction signal train is exactly equal to the average rate of change of quantity M or the average slope of curve 11.

It should be noted that the points thus far selected have not been arbitrary but were selected for specific reasons. More particularly, both sets of points were chosen firstly because they represented constant slopes for curve 11, and secondly because it was known that both of the constant slopes could be represented exactly in twelve time intervals. It will now be demonstrated that the difunction signal train will accurately represent the slope of curve 11 even when the slope is not a constant and/or the average slope cannot be represented exactly in the number of time intervals selected.

Consider first the average slope of curve 11 between the first or initial point and any other point in comparison with the average value represented by the difunction signals, these latter values being indicated below curve 14. More particularly, the average slope of curve 11 during the first thirty-five time intervals is equal to $$\frac{1}{35}(12\tfrac{1}{12}-\tfrac{1}{4})=\frac{1}{35}(11\tfrac{5}{6})$$

On the other hand, the average value of train 14 during the same period is equal to $+\frac{11}{35}$. It will now be shown that the value of the difunction signal train approximates the average slope of curve 11 within the limits of accuracy set forth in Equation 6.

Assume that an arbitrary fraction $$\frac{a}{b}$$

is to be represented in $n$ time intervals, or in other words by a difunction signal train having $n$ signals of which $x$ are +1's and $(n-x)$ are −1's. Then by definition, the average value of the difunction signal train is equal to $$\frac{x-(n-x)}{n} \text{ or } \frac{2x-n}{n}$$

Equating the two values and solving for $x$, one obtains:

$$x=\frac{n}{2b}(a+b) \qquad (10)$$

In the selected examples, the denominator $b$ is exactly equal to $n$, that is the slope as measured over $n$ intervals, and Equation 10 may be rewritten as:

$$x=\tfrac{1}{2}(a+b) \qquad (11)$$
$$=\tfrac{1}{2}(a+n) \qquad (12)$$

Solving Equation 12 for the slope of curve 11 over thirty-five intervals yields:

$$x=\tfrac{1}{2}(11\tfrac{5}{6}+35)$$
$$=\tfrac{1}{2}(46\tfrac{5}{6})$$

Since $x$ must be an integer, it is apparent that the average value of the difunction signal train over a period of thirty-five intervals cannot exactly represent the average slope of the curve over the period. In fact the closest possible values for $x$ are 22, 23, and 24 for which the average values of the train would be $\tfrac{9}{35}$, $\tfrac{11}{35}$, and $\tfrac{13}{35}$, respectively. It is, therefore, seen that difunction signal train 14 for the first thirty-five intervals shown in the drawing has an average value ($\tfrac{11}{35}$) which most closely approximates the average slope of curve 11 within the limits of accuracy of the system and has an error of less than $\tfrac{1}{35}$.

Similar approximations are made by train 14 during all of the other intervals. For example, the average slopes of curve 11 at the ends of the thirty-fourth, thirty-third, and thirty-second intervals are $\tfrac{1}{34}(11\tfrac{4}{6})$, $\tfrac{1}{33}(11\tfrac{1}{2})$, $\tfrac{1}{32}(11\tfrac{1}{3})$, respectively, while the corresponding averages of difunction train 14 are $\tfrac{6}{17}$ or $\tfrac{12}{34}$, $\tfrac{1}{3}$ or $\tfrac{11}{33}$, and $\tfrac{3}{8}$ or $\tfrac{12}{32}$, respectively. In fact, at a number of points, namely the ends of the fourth, eighth, twelfth, fifteenth, eighteenth, twenty-first, twenty-fourth and thirty-sixth intervals, the average values of train 14 are exactly equal to the slopes of curve 11.

It is important to note under what conditions the average value of difunction signal train 14 will be exactly equal to the average slope of curve 11. With reference to Equations 11 and 12, it is readily seen that, since $x$ must be an integer, the slope can be exactly represented whenever the sum of the numerator and denominator of the arbitrary fraction to be represented is equal to an even number. In other words, at the ends of the fourth, eighth, twelfth, fifteenth, eighteenth, twenty-first, twenty-fourth, and thirty-sixth intervals, where the slopes of curve 11 are $\tfrac{2}{4}$, $\tfrac{4}{8}$, $\tfrac{6}{12}$, $\tfrac{7}{15}$, $\tfrac{8}{18}$, $\tfrac{9}{21}$, $\tfrac{10}{24}$, and $\tfrac{12}{36}$, $x$ is an integer and the average of difunction signal train 14 exactly represents the average slope of curve 11. In addition, it should be noted that during the first twelve intervals when the slope of curve 11 is constant at $\tfrac{1}{2}$, difunction train 14 follows a repetitive pattern of $+1$, $-1$, $+1$, $+1$ whose average value is exactly equal to the slope of curve 11 at the end of each period of four intervals.

From these observations and from Equation 10, it can be readily determined that for any constant slope $$\frac{a}{b}$$

the difunction train will exactly represent the slope at a number of points, and that these points will be at periods from the starting point which are integral multiples of $n_0$ where $n_0$ is the least number of time intervals required to represent $$\frac{a}{b}$$

and is defined as $2b$ when the sum of $a$ and $b$ is odd, and $b$ when the sum of $a$ and $b$ is even. In the illustration used in the last paragraph, a slope $$\frac{a}{b} \text{ equal to } \tfrac{1}{2}$$

requires a minimum number $n_0$ of time intervals equal to $2b$ or 4 in order for a difunction train to exactly represent the slope. This minimum period $n_0$ may be referred to as a recurrence interval and the pattern established therein may be termed a recurrence pattern.

Although the concepts of recurrence intervals and patterns have been set forth only for a constant slope of $\tfrac{1}{2}$, they are equally applicable to all other slopes within the ranges contemplated for the system. For example, consider curve 11 during the thirteenth through twenty-fourth interval, when the slope $$\frac{a}{b} \text{ is equal to } \tfrac{1}{3}$$

By definition, the minimum recurrence period $n_0$ for this slope is equal to 3 time intervals. This conclusion is clearly borne out by the drawing wherein train 14 has a recurrence pattern of $+1$, $-1$, $+1$ for four periods $n_0$. Similarly, during the twenty-fifth through thirty-sixth time intervals, when the slope $$\frac{a}{b} \text{ of curve 11 is equal to } \tfrac{1}{6}$$

and twelve time intervals are required for the recurrence period $n_0$, no repetitive pattern is established for the difunction signal train.

It is of importance to note one further point in connection with the slope of curve 11 during the last twelve time intervals. It has been pointed out that the recurrence period required is twelve time intervals, but no statement has been made regarding the pattern or patterns established during this period. Consider now in detail the signals of difunction signal train 14 during this period and its relationship to previously established patterns.

It will be noted that during intervals twenty-five through twenty-seven, the pattern is precisely the same as that occurring during the recurrence period equivalent to a slope of $\tfrac{1}{3}$. A similar resemblance can be observed for the pattern during intervals thirty through thirty-two. On the other hand, the pattern occurring during the intervals twenty-eight and twenty-nine is $-1$, $+1$ which has an average value of $$\frac{1-1}{2} \text{ or zero}$$

A similar pattern is established for each pair of intervals of the last four intervals, that is two recurrence patterns of $+1$, $-1$ having an average value of zero. Accordingly, the last twelve signals of difunction signal train 14 include two recurrence patterns of $+1$, $-1$, $+1$ or $\tfrac{1}{3}$ and three recurrence patterns of $-1$, $+1$ or zero, the average of these patterns being one-twelfth of the sum of $\tfrac{1}{3}$ for six intervals and zero for six intervals or $$\frac{6(\tfrac{1}{3})+6(0)}{12}$$

or $$\tfrac{2}{12} \text{ or } \tfrac{1}{6}$$

It is, therefore, apparent that the difunction signal train will have an average value which closely follows the average slope of a constantly increasing curve 11, regardless of the actual value of the slope. It is obvious that the difunction signal train would follow a constantly decreasing slope equally as well. It has also been demonstrated that the difunction signal train closely follows the slope of the curve even though the curve progresses. It remains to be shown that Equation 9 is continuously followed for a fixed number of sampling time intervals $(n-m)$, as both $n$ and $m$ progress. In other words, it remains to be shown that signal difunction train 14 presents a continuous moving average of the slope of curve 11 during each sampling period.

Assume now a sampling period of ten intervals, that is $(n-m)$ equal to 10. Under these conditions consider the average value represented by train 14 and the slope of curve 11 as $n$ progresses from ten time intervals upward. Since curve 11 has a constant slope of $\frac{1}{2}$ for the first twelve intervals, then the slope of curve 11 remains constant for the first three sampling periods, that is for $n$ equal to 10, 11 and 12. On the other hand, as indicated by the number beneath the tenth signal of difunction signal train 14, the average value represented by the train during the first sampling period is equal to $\frac{2}{5}$.

It will be recalled that the average value of a difunction signal train having $n$ signals of which $$x \text{ represent} +1 \text{ is } \frac{2x-n}{n}$$

In the instant case, when $n$ is assumed to be 10, the average values which may be obtained are $$\frac{2x-10}{10}$$

Since $x$ has been defined as an integer, the difunction train can represent only even number of tenths. Accordingly, a slope of $\frac{1}{2}$ or $\frac{5}{10}$ can be represented only approximately by a 10-signal difunction train either as $\frac{4}{10}$ where $x$ is 7, or as $\frac{6}{10}$ where $x$ is 8. In the drawing difunction signal train 14 represents the slope of curve 11 during the first ten intervals as $\frac{4}{10}$ or $\frac{2}{5}$. Similarly, for the periods of intervals 2 through 11 and 3 through 12, difunction signal train 14 represents the slope of $\frac{5}{10}$ as $\frac{4}{10}$ and $\frac{6}{10}$, respectively.

Thereafter, as set forth above, the instantaneous slope changes from $\frac{1}{2}$ to $\frac{1}{3}$ and remains constant at $\frac{1}{3}$ for twelve intervals. Accordingly, the average slope for each period of ten time intervals will progressively decrease from $\frac{1}{2}$ to $\frac{1}{3}$. It will now be demonstrated that the average number represented by each group of ten difunction signals will be a moving average of these progressively decreasing slopes.

Consider first the average slope of curve 11 between the fourth through thirteenth intervals and the corresponding average value represented by difunction signal train 14. As shown in the drawing, the average slope of curve 11 during the selected period is $\frac{1}{10}(6\frac{7}{12}-1\frac{3}{4})$ or $\frac{1}{10}(4\frac{5}{6})$, while the average value represented by the train is $\frac{1}{10}(8-2)$ or $\frac{6}{10}$. Therefore the average represented by difunction signal train 14 accurately represents the average slope of curve 11 during the selected period. Similarly, the average slope of curve 11 during the fifth through fourteenth intervals is $\frac{1}{10}(6\frac{11}{12}-2\frac{1}{4})$ or $\frac{1}{10}(4\frac{2}{3})$ while the difunction signal train average is $\frac{1}{10}(7-3)$ or $\frac{4}{10}$. For the next five sampling periods the average slopes of curve 11 are $\frac{1}{10}(4\frac{1}{2})$, $\frac{1}{10}(4\frac{1}{3})$, $\frac{1}{10}(4\frac{1}{6})$, $\frac{1}{10}(4)$, and $\frac{1}{10}(3\frac{5}{6})$, respectively, while the corresponding averages represented by difunction signal train 14 are $\frac{4}{10}$, $\frac{6}{10}$, $\frac{4}{10}$, $\frac{4}{10}$, and $\frac{4}{10}$, respectively.

It is, therefore, seen that the moving average represented by difunction signal train 14 during successive periods accurately represents the changes in average slopes of curve 11. In fact, during the periods when the slopes remain constant at $\frac{1}{2}$, that is the first four sampling periods, the moving averages are $\frac{4}{10}$, $\frac{4}{10}$, $\frac{6}{10}$, and $\frac{6}{10}$, respectively, with an average of $\frac{5}{10}$ or $\frac{1}{2}$. In addition, as the slopes progressively decrease to $\frac{1}{3}$, the moving averages decrease to $\frac{4}{10}$ and finally to a value of $\frac{2}{10}$ during the period between the fourteenth and twenty-third intervals.

In summary, therefore it has been demonstrated that a difunction signal train can accurately represent the average rate of change of a variable quantity whenever the maximum rate of change of the quantity per unit time interval does not exceed the number represented by each signal of the train. This accurate representation may be either in the form of an overall average starting from an initial point and progressing on indefinitely, or in the form of a moving average in which the train reproduces the average rate of change during successive periods and ignores the past history of the quantity. In addition it has been shown that the summation of the difunction signal train continuously and accurately represents the total change in the variable quantity. In other words, if the initial position or condition of the quantity is taken into account, the summation of the difunction signal train can accurately and continuously represent the final position of the quantity. Finally, it should be apparent that the difunction theory is applicable to measuring quantities other than rate of change. Satted differently, if the difunction signal generating system were arranged to generate difunction signals representing instantaneous position or condition of an instrument, then the moving averages would continuously and accurately represent average position.

Although the explanation set forth has assumed that the maximum rate of change of the quantity does not exceed the number represented by each difunction signal, it should be evident that this limitation need not be rigorously imposed upon the system. More particularly, it is quite evident that greater rate of change could be accepted by the system so long as these rates are not continued indefinitely. In fact, if these rates are sparsely interpersed they will have a minor effect upon the summation of the difunction train and an essentially negligible effect upon the moving averages. In addition, in the case of moving averages even a number of excess rates will have only a temporary effect if they are continued for only a short period of time.

As a final statement, a difunction signal train will be recompared with conventional numerical signal trains in view of the additional information presented above. It has been stated previously that the two types of signal trains are basically distinct in that the signals of a difunction train are unweighted and non-numerical. Because of this fact, it should be evident that loss of or error in a signal of the difunction signal train has very little significance as compared with a similar loss or error in a conventional numerical signal train. For the same reason a difunction signal train continuously presents a moving average regardless of the starting point. On the other hand, in a numerical signal train, the starting point is necessarily fixed to either the most or least significant digit signal and any shift in this starting point produces completely erroneous results. Similarly, the sampling periods in a numerical system are of necessity fixed and limited and there is no possibility of obtaining continuous moving averages. Finally, since each difunction signal represents maximum rate in either one direction or the other, relatively simple linear actuators are required for response to such signals. On the other hand, conventional numerical signal trains require complex conversion devices before the information can be utilized. In fact in a number of systems employing numerical signal trains it has been found that speed of response and simplicity of equipment requires that only the most significant digit signal be utilized. In such instances the superiority of difunction signal trains is obvious, since only the most significant digit signal is generated.

Figures 2, 3:
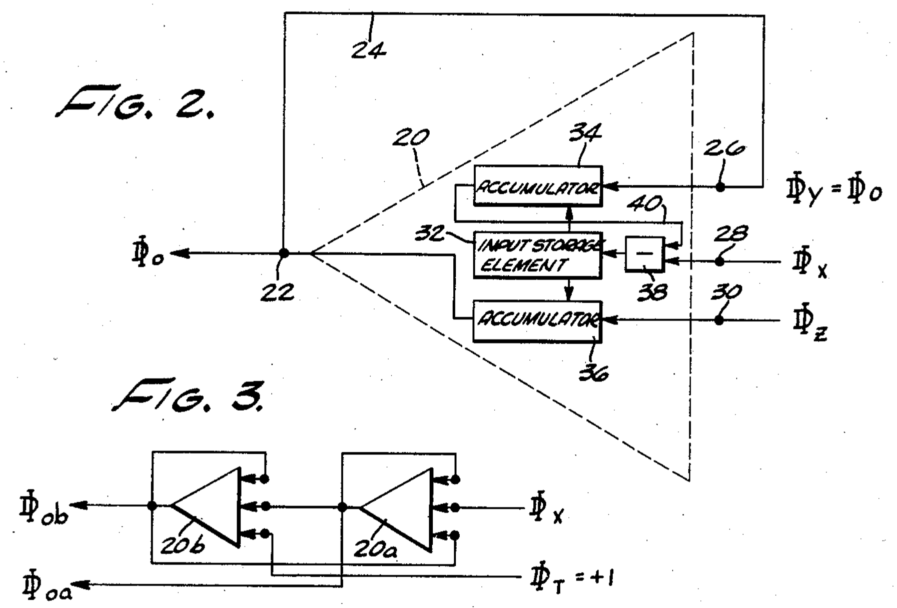
Fig. 2 is a block diagram of a difunction square root extractor, according to the invention.
Figs. 3 through 5 are block diagrams of root extractor circuits which employ two or more square root extractor circuits of the type shown in Fig. 2.

With reference once more to the drawings, wherein like or corresponding parts are designated by the same reference characters throughout the several views, there is shown in Fig. 2 a difunction square root extractor, according to the invention, which is the basic element of all difunction root extractors which may be constructed in accordance with the teachings herein disclosed. In its most basic form the square root extractor of the invention comprises a digital servo system including a difunction multiplier-divider 20 having an output terminal 22 and three input terminals, and a feedback conductor 24 for reapplying the signal which appears at output terminal 22 to a predetermined one of the input terminals.

Difunction multiplier-dividers of the general type shown in Fig. 2 are disclosed in detail and are claimed in the aforementioned U.S Patent Application Ser. No. 510,-

673, filed on May 24, 1955 by the same inventor. As shown in Fig. 2, the difunction multiplier includes three input terminals 26, 28 and 30, respectively, for receiving three associated input difunction signal trains to be operated upon. More particularly, in the usual application of a difunction multiplier-divider input terminals 26 and 28 are employed for receiving a divisor difunction signal train and a dividend difunction signal train, respectively, these signals being applied to the elements of an internal digital servo loop within the multiplier divider. Input terminal 30, on the other hand, is utilized for receiving a multiplier difunction signal train which, as will be described in more detail hereinbelow, is combined within the difunction multiplier-divider with a composite signal corresponding to a binary number which represents the quotient of the quantities represented by the divisor and dividend difunction signal trains to produce at output terminal 22 a difunction output signal train consonant with the input trains and non-numerically representative of the product of the quantities represented by the input difunction signal trains applied to input terminals 28 and 30 divided by the quantity represented by the input difunction signal train applied to input terminal 26.

The structure of the difunction multiplier-divider shown in Fig. 2 comprises four basic elements, namely, an input storage element 32 for storing a composite electrical signal representative of a binary number, a pair of electronic accumulators 34 and 36 coupled to input storage element 32 and respectively operative under the control of the signals applied at input terminals 26 and 30 for periodically combining the composite signal stored in the input storage element with composite signals stored in the accumulators, and a difunction subtractor 38 which is coupled to the input storage element 32 and which is operative to apply to the storage element an output difunction signal train representative of the difference between the difunction signal train applied to input terminal 28 and an overflow difunction signal train received from accumulator 34 over a feedback conductor 40.

As disclosed in the aforementioned copending application Ser. No. 510,673, accumulators 34 and 36 are operative, under the control of the difunction signal trains applied to their respectively associated input terminals to either add the composite signal stored in the storage element to the composite signal stored in the accumulators or to subtract the composite signal stored in the storage element from the composite signal stored in the accumulator. More specifically, if the difunction input signal to an accumulator during a particular digit time interval represents a plus one, the composite signals stored in the storage element and accumulator are combined to produce a resultant signal representing the sum of the numbers represented by the composite signals operated upon. Conversely, if the difunction input signal to an accumulator during a particular digit time interval represents a minus one, the composite signals are combined to produce a resultant signal representing the difference between the numbers represented by the signals being operated upon. These resultant signals are then stored in the accumulators, a plus one difunction signal being produced when the resultant signal exceeds the capacity of the associated accumulator, whereas a minus one overflow signal is produced if the resultant signal is equal to or less than the capacity of the accumulator. As shown in Fig. 2, the overflow difunction output signal train from accumulator 36 represents the result of the mathematical operation performed and is applied to output terminal 22, while the overflow difunction signal from accumulator 34 is reapplied to difunction subtractor 38 over conductor 40.

Now consider briefly the operation of difunction multiplier-divider 20 and the manner in which it functions to produce a resultant difunction output signal train. For the purpose of this discussion it will be assumed that feedback conductor 24 is disconnected from terminal 26 and that three input difunction signal trains $\not{D}_Y$, $\not{D}_X$ and $\not{D}_Z$ are applied to input terminals 26, 28 and 30, respectively. It will also be assumed that initially the accumulators and input storage element 32 each have the binary number zero stored therein, and that the signals in input difunction signal trains $\not{D}_X$, $\not{D}_Y$ and $\not{D}_Z$ repeat in regular recurrence patterns in successive recurrence periods whereby the three input signal trains respectively represent three constant fractions.

It may be shown that the difunction output signal from accumulator 34 represents a rate which is equal to $\not{D}nY$, where $n$ is the number stored in input storage element 32 and Y is the quantity represented by the input train applied to terminal 26. This output signal is applied over conductor 40 to difunction subtractor 38 wherein it is subtracted from input difunction signal train $\not{D}_X$, the output signal from the difunction subtractor in turn being applied to the input storage element to complete a digital feedback loop. Inasmuch as it has been assumed that initially the number stored in the input storage element is zero, it is clear that initially the difunction rate $\not{D}_X$ will exceed the difunction overflow rate from accumulator 34, or in other words, will include more (+1)'s over a given interval than the overflow difunction signal. Consequently the difunction output signal from the difunction subtractor will be operative to increase the number stored in the storage element.

It will also be recognized that as long as the rate represented by input difunction $\not{D}_X$ is greater than the overflow difunction rate represented by $\not{D}nY$, the average value of the number $n$ in storage element 32 will continue to increase, and that each increase in $n$ will be reflected as an increase in the overflow difunction rate $\not{D}nY$. It is clear, therefore, that the number stored in the input storage element will exponentially approach an equilibrium at which the rate $\not{D}nY=\not{D}_X$. Thereafter any tendency for the number $n$ to increase will cause the rate $\not{D}nY$ to exceed the rate $\not{D}_X$, and consequently the difunction subtractor will reduce the size of the number $n$; conversely, any tendency of the number $n$ to decrease will servo the rate $\not{D}nY$ to average less than the rate $\not{D}_X$ and the difunction subtractor will increase the size of the number $n$. It may be shown, therefore, that the number $n$ stored in the input storage element will oscillate about, and in the ultimate tend to stabilize at a value which will cause the overflow difunction signal rate $\not{D}nY$ to equal the input difunction rate $\not{D}_X$. Since $\not{D}nY$ is the difunction representation of $n\not{D}Y$, we may consequently write:

$$n\not{D}_Y=\not{D}_X \qquad (13)$$

or $$n=\frac{\not{D}_X}{\not{D}_Y} \qquad (14)$$

which signifies that the binary number stored in the input storage element represents the quotient of the mathematical operation of division upon the numbers represented by the input difunction signal trains $\not{D}_X$ and $\not{D}_Y$.

Consider now the concomitant operation of accumulator 36 and its response to the input difunction signal train $\not{D}_Z$. It may again be shown that the signal presented at output terminal 22 will be a difunction signal representative of $\not{D}_{nZ}$, where $n$ is the binary number stored in input storage element 32. But as indicated by Equation 14 above, this number represents the numerical equivalent of the quotient of input difunction signal $\not{D}_X$ divided by input difunction signal $\not{D}_Y$. Consequently the output difunction signal presented at output terminal 22 is:

$$\not{D}_0=\not{D}_{nZ}=\frac{\not{D}_X\not{D}_Z}{\not{D}_Y}=\frac{\not{D}_{XZ}}{Y} \qquad (15)$$

or in other words, the output difunction signal is non-numerically representative of the product of the numerical equivalents of the quantities non-numerically represented by input difunction signal trains $\not{D}_X$ and $\not{D}_Z$, divided by the numerical equivalent of the quantity non-numerically represented by input difunction signal train $\not{D}_Y$.

It the foregoing description of operation it has been assumed that the three input difunction signal trains were numerically representative of constant fractions, or in other words, that the signals in each train were cyclically repetitive in accordance with a predetermined pattern. Assume now that one or more of the quantities represented by the input difunction signal trains starts to vary as a function of time so that their difunction representations also vary with time. The effect of a change in the pattern of either the $\not{D}_X$ or $\not{D}_Y$ input difunction trains is to unstabilize the feedback loop formed by storage element 32, accumulator 34 and difunction subtractor 38, these elements then coacting to again drive the system to equilibrium. If one or both of the input difunction trains $\not{D}_X$ or $\not{D}_Y$ is continually changing with time, the equilibrium condition, as represented by the numerical quotient stored in the storage element, will also continually change with time. Consequently, the output difunction signal train presented at output terminal 22 will continually change with time in accordance with changes in the numerical quotient representative of $$\frac{\not{D}_X}{\not{D}_Y}$$

In a similar manner, changes in the input difunction signal train $D_Z$ will also be reflected directly as changes in the pattern of the output difunction signal train, in accordance with Equation 15.

Consider now the operation of the difunction square root extractor shown in Fig. 2 wherein feedback conductor 24 is employed to reapply to accumulator 34 the difunction output signal train presented at output terminal 22. It will immediately be recognized that Equation 15 may be rewritten as:

$$\not{D}_0=\frac{\not{D}_X\not{D}_Z}{\not{D}_0} \qquad (16)$$

which may be transformed to:

$$\not{D}_0=\not{D}\sqrt{XZ} \qquad (17)$$

Accordingly, the output difunction signal train appearing at output terminal 22 of the difunction square root extractor of the invention is non-numerically representative of the square root of the product of the quantities non-unmerically represented by the input difunction signal trains $\not{D}_X$ and $\not{D}_Z$.

In order to most clearly teach the proper application of the difunction root extractor of the invention to both control systems and the solution of mathematical equations, it will now be demonstrated that the relative magnitudes of the fractions represented by the input difunction signal trains should be considered in coding a problem for solution. Since a difunction signal is capable of representing any fraction within the range from +1 to −1, it will be recognized that storage element 32 must be capable of storing binary numbers representative of all fractions within this range. It will also be recognized that the sign or polarity of the fraction must also be represented owing to the fact that the system must be capable of distinguishing between two fractions having the same absolute magnitude but different polarities.

Fortunately, the foregoing requirement that the sign of the fraction be represented is consistent with another system requirement, namely, that in the plus one minus one difunction system the number stored in the storage element should average out to a value equal to $$\frac{1+\frac{\not{D}_X}{\not{D}_Y}}{2}$$

so that when the number is additively transferred to the accumulators the output difunction signal train will be generated in the (+1) and the (−1) difunction system. That this is so may be readily demonstrated by considering the operation of the storage element and accumulator 34 when $\not{D}_Y=+1$ and a number ($n$) representing the quantity zero is stored in storage element 32. Clearly the difunction output signal from accumulator 34 should then represent zero, and should include alternate plus ones and minus ones. However, in order to make accumulator 34 overflow every other digit time interval to generate a (+1), it will be recognized that the zero representing number stored in the storage element must equal one half the capacity of the storage element; in addition, it will be recognized that in a binary number system half of the numerical capacity representable is readily represented by a one in the most significant digit, followed by all zeroes. In order to graphically illustrate this concept, the fractional values representable by the binary numbers which may be expressed in a four binary digit storage element are set forth in the following table:

*Table I*

| Binary number stored in storage element 32 | Decimal equivalent of binary number | Fraction represented |
|---|---|---|
| 0000 | 0 | −1 |
| 0001 | 1 | −7/8 |
| 0010 | 2 | −3/4 |
| 0011 | 3 | −5/8 |
| 0100 | 4 | −1/2 |
| 0101 | 5 | −3/8 |
| 0110 | 6 | −1/4 |
| 0111 | 7 | −1/8 |
| 1000 | 8 | 0 |
| 1001 | 9 | +1/8 |
| 1010 | 10 | +1/4 |
| 1011 | 11 | +3/8 |
| 1100 | 12 | +1/2 |
| 1101 | 13 | +5/8 |
| 1110 | 14 | +3/4 |
| 1111 | 15 | +7/8 |

Examination of Table I will reveal that the sign or polarity of the fraction represented by the number stored in the storage element is given by the most significant digit of the binary number, while the last three digits of the binary number represent the magnitude of the fraction. It will also be noted that if a binal point is assumed to exist to the left of the most significant binary digit, or in Table I the left-hand digit, each binary number is equal to $$\frac{1+\text{fraction represented}}{2}$$

as desired.

It will also be appreciated from Table I that the maximum fraction which may be represented by a four binary digit system is +⅞. Clearly, however, difunction multiplier divider 20 may utilize registers whose capacity is much larger than four binary bits, in which instance the maximum fraction which may be represented very nearly approaches +1. For example, if the capacity of storage element 32 were ten binary digits, the most significant of which represented sign, then the maximum fraction which could be represented would be $$+\frac{511}{512}$$

Consider now the limitations imposed on the difunction square root extractor of the invention by virtue of the fact that the numerical value of the composite signal stored in storage element 32 cannot exceed unity. It will be recalled from Equation 15 that output difunction signal train $\not{p}_O=\not{p}_{nZ}=n\not{p}_Z$. It is clear therefore that:

$$\not{p}_Z>\not{p}_O \quad (18)$$

since unless this condition is met $n$ would be equal to or greater than unity.

In a similar manner, it will be recognized that Equation 14 may be rewritten as:

$$n=\frac{\not{p}_X}{\not{p}_O} \quad (19)$$

since the output difunction signal train $\not{p}_O$ is fed back to input terminal 26. Hence $n\not{p}_O=\not{p}_X$. Since again the same limitation is imposed on the magnitude of $n$, namely that it must be less than unity, it is clear that:

$$\not{p}_O>\not{p}_X \quad (20)$$

Accordingly, by combining condition (18) with condition (20) there is obtained:

$$\not{p}_Z>\not{p}_O>\not{p}_X \quad (21)$$

which signifies that the quantity represented by input difunction signal train $\not{p}_Z$ must be larger than the quantity represented by the output difunction signal train $\not{p}_O$, which in turn must be larger than the quantity represented by input difunction signal train $\not{p}_X$. Recalling now from Equation 17 that signal train $\not{p}_O$ represents the square root of the quantities represented by input difunction signal trains $\not{p}_Z$ and $\not{p}_X$, it is mathematically obvious that all premises of conditions (21) will be met if:

$$\not{p}_Z>\not{p}_X \quad (21a)$$

It will be recognized that condition (21*a*), as applied to the utilization of the difunction root extractor of the invention, implies that if the square root is to be taken of the product of the quanties represented by two input difunction signal trains, the quantity represented by the difuction signal train applied to accumulator 36 must be larger than the quantity represented by the difunction signal train applied to the difunction subtractor. Accordingly, in utilizing the difunction root extractor for solving equations or for performing control functions, care should be taken to assure that the input signal trains are applied to the proper input terminal so that condition (21*a*) is satisfied.

Still another feature of the invention may be recognized from condition (21*a*). In the discussion of operation set forth hereinabove it has been assumed that the difunction square root extractor of the invention was receiving two input difunction signal trains $\not{p}_X$ and $\not{p}_Y$, respectively, representative of two variable quantities. However, it is obvious that the root extractor circuit of Fig. 2 may also be utilized to obtain the square root of the quantity represented by a single input difunction train by applying to input terminal 28 the signal train to be operated upon and by applying to terminal 30 a constant high level voltage which simulates a difunction signal train representative of +1. Condition (21*a*) is thus satisfied, while Equation 17 then reduces to:

$$\not{p}_O=\not{p}\sqrt{X} \quad (22)$$

In further describing the invention hereinbelow, simulated difunction signal trains representative of a continuous train of plus one difunction signals will be designated by a difunction signal train $$\not{p}_T=+1$$

It is to be expressly understood, however, that in practice the identical simulation may be accomplished through an electronic equivalent by constructing difunction multiplier-divider 20 so that only additive transfers may be made between input storage element 32 and accumulator 36. By thus eliminating subtractive transfers between these elements the circuit behaves as though it were responding to a $\not{p}_Z$ input difunction signal train continuously representative of a plus one.

It will be recalled that the difunction square root extractor shown in Fig. 2 is not only a specific embodiment of a square root extractor, according to the invention, but also constitutes the basic unit through the utilization of which there may be constructed other root extractors which are capable of generating difunction signals representative of a root other than the square root of the input signal. With reference now to Fig. 3, there is shown a difunction cube root extractor which includes two difunction square root extractor circuits **20*a* and 20*b*, the input terminals being designated by the same reference numerals employed in Fig. 2 with a subscript corresponding to the alphabetical subscript which designates the associated square root extractor circuit. The input difunction signal train $\not{p}_X$ to be operated upon is applied to input terminal 28*a* of square root extractor 20*a* while the difunction output signal $\not{p}_{Oa}$ from root extractor circuit 20*a* is in turn applied to input terminal 28*b* of root extractor circuit 20*b*. In addition the difunction output signal $\not{p}_{Ob}$ from root extractor circuit 20*b* is reapplied to input terminal 30*a* of root extractor circuit 20*a*, whereas a simulated difunction signal $\not{p}_T$ representative of $a+1$ is applied to input terminal 30*b* of root extractor circuit 30*b***.

Consider now the quantities represented by the difunction signal trains $\not{p}_{Oa}$ and $\not{p}_{Ob}$. In accordance with Equation 17 these trains may be defined as:

$$\not{p}_{Oa}=\sqrt{\not{p}_X\cdot\not{p}_{Ob}} \quad (23)$$

and $$\not{p}_{Ob}=\sqrt{\not{p}_{Oa}} \quad (24)$$

substituting Equation 24 in Equation 23 produces:

$$\not{p}_{Oa}=(\not{p}_X)^{1/2}\cdot(\not{p}_{Oa})^{1/4} \quad (25)$$

which simplifies to:

$$\not{p}_{Oa}=(\not{p}_X)^{2/3} \quad (26)$$

which when substituted back into Equation 24 gives:

$$\not{p}_{Ob}=(\not{p}_X)^{1/3} \quad (27)$$

Accordingly it will be recognized that the root extractor circuit of Fig. 2 produces one output difunction signal train ($\not{p}_{Ob}$) which non-numerically represents the cube root of the quotient non-numerically represented by the input difunction signal train $\not{p}_X$, and a second output signal train $\not{p}_{Oa}$ which non-numerically represents the cube root of the square of the quantity represented by the input difunction signal train $\not{p}_X$.

Figure 4:
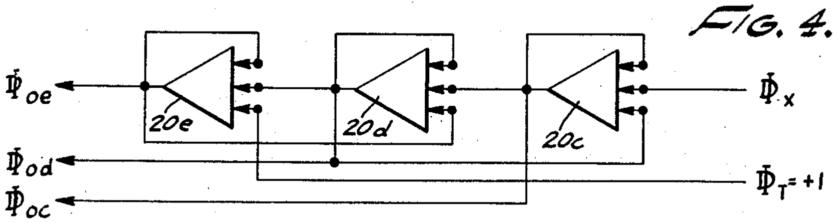

It will be noted from Fig. 3 that the connection which controls the manner in which root extractor circuits **20*a* and 20*b* cooperate is the feedback loop which applies output signal $\not{p}_{Ob}$ from circuit 20*b* to input terminal 30*a* of circuit 20*a*. It may be shown that if the same connection is employed between adjacent square root extractor circuits in a series of M cascaded square root extractor circuits, the $(M+1)^{th}$ root may be extracted. For example, there is shown in Fig. 4 three serially connected root extractor circuits 20*c*, 20*d* and 20*e*, respectively, the difunction output signals $\not{p}_{Od}$ and $\not{p}_{Oe}$ from circuits 20*d* and 20*e* being reapplied to input terminals 30*c* and 30*d*, respectively, of square root extractor circuits 20*c* and 20*d***. It will now be shown that this circuit will produce the $M+1=3+1$ or fourth root of the input difunction signal train.

In accordance with Equation 17, the output difunction signal trains from the individual square root extractor circuits may be written as:

$$\not{p}_{Oc}=\sqrt{\not{p}_X\cdot\not{p}_{Od}} \quad (28)$$

$$\not{p}_{Od}=\sqrt{\not{p}_{Oc}\cdot\not{p}_{Oe}} \quad (29)$$

$$\not{p}_{Oe}=\sqrt{\not{p}_{Od}} \quad (30)$$

Substituting Equation 30 in Equation 29 produces:

$$\not{D}_{Od}=(\not{D}_{Oc})^{1/2}\cdot(\not{D}_{Od})^{1/4} \qquad (31)$$

which may be transformed to:

$$\not{D}_{Od}=(\not{D}_{Oc})^{2/3} \qquad (32)$$

Now if Equation 32 is substituted in Equation 28 there is obtained:

$$\not{D}_{Oc}=(\not{D}_{X})^{1/2}(\not{D}_{Oc})^{1/3} \qquad (33)$$

which when solved for $D_{Oc}$ gives:

$$\not{D}_{Oc}=(\not{D}_{X})^{3/4} \qquad (34)$$

Substituting Equation 34 back into Equation 32 gives:

$$\not{D}_{Od}=(\not{D}_{X})^{2/4}=(\not{D}_{X})^{1/2} \qquad (35)$$

and substitution of Equation 35 back into Equation 30 gives:

$$\not{D}_{Oe}=(D_{X})^{1/4} \qquad (36)$$

Accordingly, three output difunction signal trains are produced which are representative of the quantity represented by the input difunction signal train $\not{D}_X$ taken to the ¼, ½, and ¾ powers. Clearly then, any root Q may be obtained by employing $(Q-1)$ serially connected root extractor circuits in which the output signal from each circuit is reapplied to input terminal 30 of the preceeding square root extractor circuit.

Figure 5:
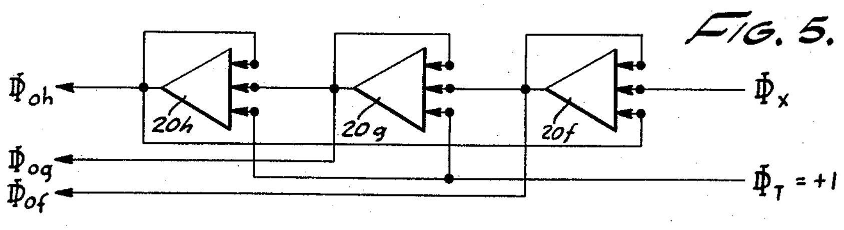

It is obvious however, that numerous other feedback connections may be utilized between adjacent square root extractor circuits which are serially connected. With reference now to Fig. 5, for example, there is shown a root extractor circuit which employs three square root extractor circuits 20*f*, 20*g* and 20*h*, the output signal from square root extractor circuit 20*h* being fed back to input terminal 30*f* of square root extractor circuit 20*f*. The equations for this particular circuit may be developed as follows:

$$\not{D}_{Of}=\sqrt{\not{D}_{X}\cdot\not{D}_{Oh}} \qquad (37)$$

$$\not{D}_{Og}=\sqrt{\not{D}_{Of}} \qquad (38)$$

$$\not{D}_{Oh}=\sqrt{\not{D}_{Og}} \qquad (39)$$

Substituting Equation 38 in Equation 39 and Equation 39 in Equation 37 produces:

$$\not{D}_{Of}=(\not{D}_{X})^{1/2}\cdot(\not{D}_{Of})^{1/8} \qquad (40)$$

which when reduced gives:

$$\not{D}_{Of}=(\not{D}_{X})^{4/7} \qquad (41)$$

Substituting back into Equation 38 then gives:

$$\not{D}_{Og}=(\not{D}_{X})^{2/7} \qquad (42)$$

which when substituted into Equation 39 gives:

$$\not{D}_{Oh}=(\not{D}_{X})^{1/7} \qquad (43)$$

or the seventh root of the quantity represented by the input difunction signal train $\not{D}_X$ which is applied to the first square root circuit.

It may be demonstrated that given any number M of serially connected square root extractor circuits it is possible to obtain any root up to the $2^M$ root. Thus, for example, to obtain the 127th root of the quantity represented by the applied input difunction signal trains only 7 serially connected square root extractor circuits are required since these are capable of extracting any root up to and including the $2^7$th or 128th root of the applied input difunction signal train.

In order to establish this fact more conclusively, consider the roots which may be obtained with four serially connected square root extractor circuits 20*w*, 20*x*, 20*y* and 20*z* by merely varying the feedback connections between the circuits. The following table illustrates the signals which are applied to input terminal 30 of the four circuits to provide any desired root up to and including the $2^4$th or 16 root.

*Table II*

| Square root extractor circuits | | | | Roots extracted expressed as powers of $\not{D}_X$ | | | |
|---|---|---|---|---|---|---|---|
| 20*w* — Input 30*w* | 20*x* — Input 30*x* | 20*y* — Input 30*y* | 20*z* — Input 30*z* | $\not{D}_{Ow}$ | $\not{D}_{Ox}$ | $\not{D}_{Oy}$ | $\not{D}_{Oz}$ |
| +1 | +1 | +1 | +1 | 8/16=1/2 | 4/16=1/4 | 2/16=1/8 | 1/16 |
| $\not{D}_{Oz}$ | +1 | +1 | +1 | 8/15 | 4/15 | 2/15 | 1/15 |
| +1 | $\not{D}_{Oz}$ | +1 | +1 | 7/14=1/2 | 4/14=2/7 | 2/14=1/7 | 1/14 |
| $\not{D}_{Oz}$ | $\not{D}_{Oz}$ | +1 | +1 | 7/13 | 4/13 | 2/13 | 1/13 |
| +1 | +1 | $\not{D}_{Oz}$ | +1 | 6/12=1/2 | 3/12=1/4 | 2/12=1/6 | 1/12 |
| $\not{D}_{Oz}$ | +1 | $\not{D}_{Oz}$ | +1 | 6/11 | 3/11 | 2/11 | 1/11 |
| +1 | $\not{D}_{Oz}$ | $\not{D}_{Oz}$ | +1 | 5/10=1/2 | 3/10 | 2/10=1/5 | 1/10 |
| $\not{D}_{Oz}$ | $\not{D}_{Oz}$ | $\not{D}_{Oz}$ | +1 | 5/9 | 3/9=1/3 | 2/9 | 1/9 |
| +1 | +1 | +1 | ------ | 4/8=1/2 | 2/8=1/4 | 1/8 | ------ |
| $\not{D}_{Oy}$ | +1 | +1 | ------ | 4/7 | 2/7 | 1/7 | ------ |
| +1 | $\not{D}_{Oy}$ | +1 | ------ | 3/6=1/2 | 2/6=1/3 | 1/6 | ------ |
| $\not{D}_{Oy}$ | $\not{D}_{Oy}$ | +1 | ------ | 3/5 | 2/5 | 1/5 | ------ |
| +1 | +1 | ------ | ------ | 2/4=1/2 | 1/4 | ------ | ------ |
| $\not{D}_{Ox}$ | +1 | ------ | ------ | 2/3 | 1/3 | ------ | ------ |
| +1 | ------ | ------ | ------ | 1/2 | ------ | ------ | ------ |

Consider now the significance of Table II and the manner in which it facilitates the interconnection of a plurality of square root extractor circuits to provide any desired root. It will be noted from Table II that the sixteenth root is obtained by merely cascading all four square root extractor circuits and applying a $\not{D}_T=+1$ difunction signal train to terminals 30*w*, 30*x*, 30*y* and 30*z*. The fifteenth root, on the other hand, is obtained by applying a plus one difunction signal train only to input terminals 30*x*, 30*y* and 30*z*, while output signal $\not{D}_{Oz}$ from square root extractor circuit 20*z* is applied to input terminal 30*w*.

Compare now the connections for the fifteenth root with the connections set forth in Table II for the fourteenth through ninth roots. It will be noted that the output signal $\not{D}_{OZ}$ from square root extractor circuit 20*z* is applied to input terminal 30*x* for the fourteenth root, to input terminals 30*w* and 30*x* for the thirteenth root, to input terminal 30*y* for the twelfth root, to input terminals 30*w* and 30*y* for the eleventh root, to input terminals 30*x* and 30*y* for the tenth root, and finally, to all three input terminals 30*w*, 30*x* and 30*y* for the ninth root. It will thus be recognized that the application of output signal $\not{D}_{OZ}$ to the input terminals of the preceding square root circuits follows a binary progression from the sixteenth through ninth roots. Thereafter from the eighth through fifth roots, only three square root circuits are required to generate the desired roots, the interconnections again following a binary progression. Similarly, only two square root extractor circuits are required for the third and fourth roots, while obviously only a single square root extractor circuit is required to generate the square root.

From the foregoing observations the interconnections for obtaining any desired root may be expressed by the following equation:

$$2^M-r=N \qquad (44)$$

where

*r* is the root to be extracted, expressed as a binary number

M is the number of square root circuits required as defined by the condition $$2^M\geq r>2^{(M-1)}$$

and

N is an M-digit binary number indicative of the interconnections to be made.

More specifically, the digits of the binary number N correspond respectively to the square root extractor circuits, the least significant digit of the number corresponding to the first square root extractor circuit in the cascaded chain of M circuits, while the most significant digit of the number corresponds to the last square root extractor in the chain. In interconnecting the circuits, a plus one difunction train ($\not{D}_T$) is applied to input terminal 30 of each square root extractor circuit whose corresponding binary digit in number N has a value of zero, while the output signal $\not{D}_{OM}$ from the last square root extractor circuit is applied to input terminal 30 of each square root extractor circuit whose corresponding binary digit in the number N has a value of one.

Figure 6:
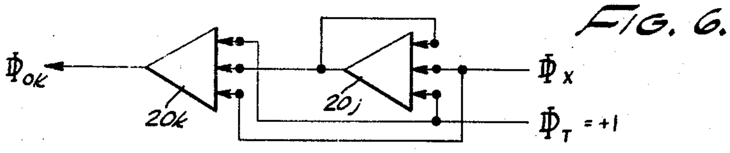
Figs. 6 and 7 are block diagrams of root extractor circuits, according to the invention, which employ a square root extractor circuit in combination with a difunction multiplier-divider.

It should also be pointed out that the square root extractor circuit shown in Fig. 2 may also be employed in conjunction with one or more plain difunction multiplier-dividers of the type employed in the square root circuit. For example there is shown in Fig. 6 a difunction root extractor circuit **20*j* which is operable on conjunction with a difunction multiplier-divider 20*k*** to provide an output difunction $$\not{D}_{Ok}=\not{D}_X^{3/2} \qquad (45)$$

Figure 7:
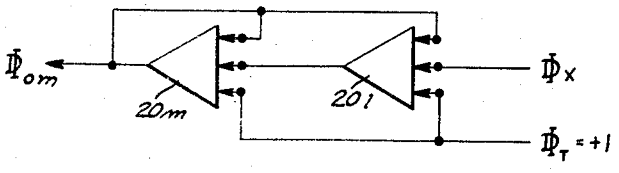

In Fig. 7, on the other hand, there is shown a difunction multiplier-divider 201 and a difunction square root extractor circuit **20*m*** which are operative to produce an output difunction signal train $D_{Om}$ which may be expressed as:

$$\not{D}_{Om}=\not{D}_X^{1/3} \qquad (46)$$

Thus the cube root of the input function may be extracted other than by employing two difunction root extractors as was done in Fig. 3.

It should be noted here that all of the difunction root extractors heretofore disclosed employ square root extractor circuits of the type shown in Fig. 2 wherein the feedback loop between output terminal 22 and input terminal 26 merely comprises conductor 24. It should be pointed out, however, that other forms of feedback loops may be utilized to provide root extractors, according to the invention, which are capable of solving polynomial equations for their roots.

Figure 8:
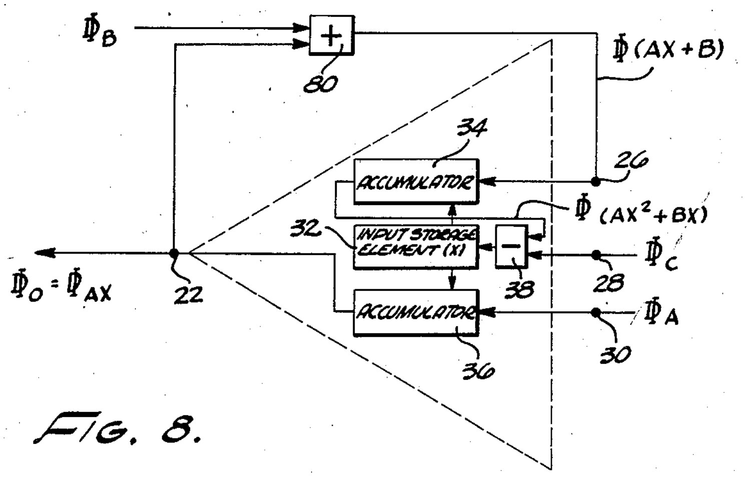
Fig. 8 is a block diagram of a difunction root extractor circuit which may be employed for extracting the roots of a quadratic function.

With reference now to Fig. 8, there is shown a root extractor circuit which may be employed for solving quadratic equations of the form $$AX^2+BX=C \qquad (47)$$

As shown in Fig. 8, the basic structure of this root extractor is substantially the same as that of the square root extractor circuit shown in Fig. 2 with the exception that the feedback loop intercoupling output terminal 22 with input terminal 26 includes a difunction adder 80 which produces a difunction output signal train corresponding to the sum of the difunction train appearing at output terminal 22 and an applied input difunction signal train $\not{D}_B$ which represents the coefficient B in Equation 47. The difunction input signal trains applied to input terminals 28 and 30, on the other hand, respectively represent the coefficients C and A in Equation 47.

Substituting now in Equation 15 there is obtained:

$$\not{D}_O=\frac{\not{D}_A\not{D}_C}{\not{D}_O+\not{D}_B} \qquad (48)$$

which when simplified gives:

$$\not{D}_O^2+\not{D}_O\not{D}_B=\not{D}_A\not{D}_C \qquad (49)$$

If it is now assumed that at stability, the number stored in storage element 32 is X, then:

$$\not{D}_O=\not{D}_{XA}=X\not{D}_A \qquad (50)$$

Substituting Equation 50 in Equation 49 and simplifying then gives:

$$\not{D}_AX^2+\not{D}_BX=\not{D}_C \qquad (51)$$

which is of the same form as Equation 47 which is to be solved. Accordingly, as indicated by Equation 50, the output signal appearing at output terminal 22 represents the root X of the equation being solved multiplied by the coefficient A.

Figure 9:
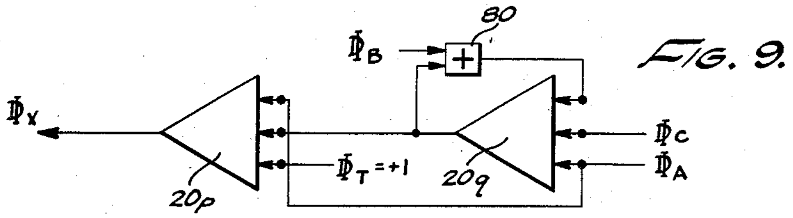
Fig. 9 is a block diagram of a root extractor circuit which embodies the circuit of Fig. 8 and which is operative to generate a difunction output signal representative of the roots of a quadratic function.

With reference now to Fig. 9, there is shown a circuit which is operative to generate an output difunction signal train $\not{D}_X$ representative of the root of Equation 47. Basically the circuit includes a difunction multiplier-divider **20*p* and a difunction root extractor 20*q* identical with the root extractor circuit shown in Fig. 8, multiplier-divider 20*p* being operative to divide the difunction output signal train $\not{D}_{XA}$ from extractor circuit 20*q* by the difunction signal train representing the coefficient A. It is clear, therefore, that the output signal from multiplier-divider 20*p*** is:

$$\frac{\not{D}_{XA}}{\not{D}_A}=\not{D}_X \qquad (52)$$

Figure 10:
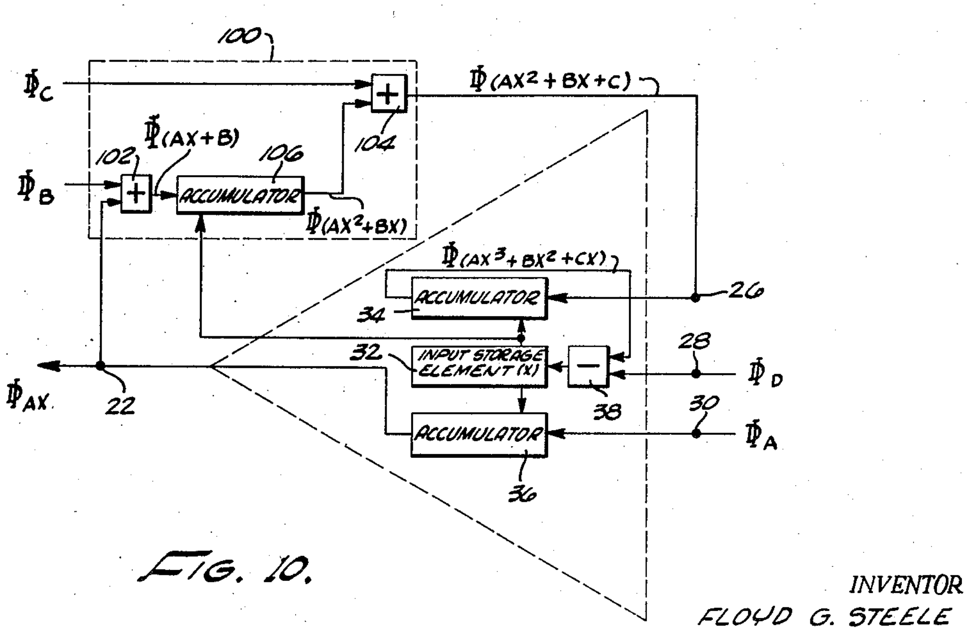
Fig. 10 is a block diagram of a difunction root extractor circuit which is operative to generate a difunction output signal representative of the roots of a third order polynomial.

With reference now to Fig. 10, there is shown another root extractor circuit for generating an output difunction signal train representing the roots of a higher order polynomial function, the specific circuit shown being operative to solve third order polynomials. As shown in Fig. 10, a feedback circuit 100 is utilized to interconnect output terminal 22 with divisor terminal 26, the feedback circuit including a pair of difunction adders 102 and 104, and an additional accumulator 106 which is operative under the control of the output signal from difunction adder 102 to accumulate numerical transfers from input storage element 32 in the same manner in which accumulators 34 and 36 are operative.

In operation difunction signal trains $\not{D}_A$, $\not{D}_B$, $\not{D}_C$ and $\not{D}_D$, representative of the coefficients of a third order polynomial of the form:

$$AX^3+BX^2+CX=D \qquad (53)$$

are applied to input terminal 30, difunction adders 102 and 104, and input terminal 28, respectively. The values of the various difunction trains thereby generated within the root extractor circuit are shown in Fig. 10, the system reaching equilibrium with a root (X) represented in storage element 32 whenever the input difunction signals to difunction subtractor circuit 38 are equal, or in other words, whenever $$\not{D}_{(AX^3+BX^2+CX)}=\not{D}_D \qquad (54)$$

From the foregoing illustrative embodiments it should be clear that the root extractor circuits herein disclosed may be constructed, combined, and utilized in a variety of ways. For example, it will be recognized that a root extractor circuit for solving an *n*th order polynomial may be constructed by utilizing the basic circuit of Fig. 10 and compounding feedback circuit 100 with an additional accumulator and difunction adder for each order of the function above the third order. Accordingly, it is to be expressly understood that the spirit and scope of the invention is to be limited only by the spirit and scope of the appended claims.

What is claimed as new is:

1. A difunction square root extractor circuit for generating a difunction output signal train non-numerically representative of the square root of the product of the quantities represented by first and second input difunction signal trains, said square root extractor circuit comprising: a difunction multiplier-divider having divisor, dividend and multiplier input terminals for receiving difunction signal trains, respectively, said difunction multiplier-divider including an output terminal and means for presenting at said output terminal a difunction output signal non-numerically representative of the quotient of the quantities represented by the difunction signal trains applied to said divisor and dividend terminals multiplied by the quantity represented by the difunction signal train applied to said multiplier input terminal; means for applying the first and second input difunction signal trains to said dividend and multiplier input terminals, respectively; and feedback means for applying to said divisor input terminal the difunction output signal presented at said output terminal.

2. A difunction square root extractor circuit for generating a difunction output signal train representative of the square root of the product of first and second quantities, respectively represented by first and second difunction input signal trains of bivalued electrical signals, each signal of a signal train having either a first value representing a first algebraic number or a second value representing a second algebraic number, the quantity represented by each input signal train being equal to the algebraic average of the numbers represented by the signals in the train, said square root extractor circuit comprising: a difunction multiplier-divider having divisor, dividend and multiplier input terminals for receiving difunction signal trains, respectively, said difunction multiplier-divider also having an output terminal and including first means for generating a composite electrical signal numerically representative of the quotient of the quantities represented by the difunction signal trains applied to said divisor and dividend terminals, and second means for presenting at said output terminal a difunction output signal train representative of the product of the quantity numerically represented by said composite signal and the quantity represented by the difunction signal train applied to said multiplier input terminal; means for applying the first and second difunction input signal trains to said dividend and multiplier input terminals, respectively; and feedback means intercoupling said output terminal with said divisor input terminal for applying to said divisor input terminal the difunction output signal train presented at said output terminal.

3. The difunction square root extractor circuit defined in claim 2 wherein said feedback means comprises a conductor interconnecting said output terminal with said divisor terminal.

4. The difunction square root extractor circuit defined in claim 2 wherein the algebraic numbers represented by said first and second values of the signals in the input signal trains are plus one and minus one, respectively, and wherein said means for applying the first and second input signal trains to said dividend and multiplier terminals includes means for applying a signal having a continuous value of plus one to said multiplier terminal whereby the quantity represented by the second difunction input signal train is plus one and the quantity represented by said difunction output signal train is the square root of the quantity represented by the first difunction input signal.

5. A difunction square root extractor circuit for generating a difunction output signal train representative of the square root of the product of first and second quantities represented by first and second difunction input signal trains of bivalued electrical signals, each signal of a signal train having either a first value representing a first algebraic number or a second value representing a second algebraic number, the quantity represented by each input signal train being equal to the algebraic average of the numbers represented by the signals in the train, said square root extractor circuit comprising: first cyclically operable storage means including first and second input terminals for receiving difunction signal trains; means for applying the first input difunction signal train to said first input terminal, said first storage means being operable during each cycle for producing a composite signal representative of the summation of the differences between the signals of the first input difunction signal train and the corresponding signals applied to said second input terminal during the preceding cycles; second and third cyclically operable storage means coupled to said first cyclically operable storage means, each of said second and third storage means having an input terminal and being operable during successive cycles for producing an output difunction signal train consonant with said first difunction signal train and representative of the summation of the products of the signals applied to its associated input terminal and the corresponding composite signal stored in said first storage means; a first feedback loop for applying the difunction output signal from said second storage means to said second input terminal of said first storage means; means for applying the second input difunction signal train to said input terminal of said third storage means; and a second feedback loop for applying the difunction output signal from said third storage means to said input terminal of said second storage means whereby said difunction output signal from said third storage means non-numerically represents the square root of the product of the quantities represented by said first and second input difunction signal trains.

6. A difunction square root extractor circuit for generating a difunction output signal train non-numerically representative of the square root of the quantity represented by a difunction input signal train, said square root extractor circuit comprising: a difunction divider having first and second input terminals for receiving difunction signal trains, respectively, said divider also having an output terminal and including means for presenting at said output terminal a difunction output signal train non-numerically representative of the quotient of the quantities represented by the difunction signal trains applied to said first and second input terminals; means for applying the input difunction signal train to said first input terminal; and a feedback circuit for applying said difunction output signal train to said second input terminal.

7. A difunction square root extractor circuit for generating a difunction output signal train non-numerically representative of the square root of the quantity represented by a difunction input signal train, said square root extractor circuit comprising: a difunction computing element having a first input terminal and a second input terminal for receiving difunction signal trains, respectively, said computing element also having an output terminal and including first means for generating a composite electrical signal numerically representative of the quotient of the quantities represented by the difunction trains applied to said first and second input terminals, respectively, and signal conversion means coupled to said first means and responsive to said composite signal for presenting at said output terminal a difunction output signal non-numerically representative of the quantity numerically represented by said composite signal; means for applying the input difunction signal train to said first input terminal; and a feedback circuit for applying said difunction output signal to said second input terminal.

8. A difunction square root extractor circuit comprising: a difunction computing element having at least first and second input terminals for receiving difunction signal trains and an output terminal for presenting a difunction output signal train; feedback means for applying to said second input terminal the signal appearing at said output terminal, said difunction computing element including first means for generating a composite signal numerically representative of the quotient of the quantities non-numerically represented by the difunction signals applied to said first and second input terminals and second means coupled to said first means for presenting at said output terminal a difunction output signal non-numerically representative of a quantity proportional to the quotient represented by said composite signal; and means for applying to said first input terminal a difunction signal train to be operated upon whereby said output signal is non-numerically representative of a quantity proportional to the square root of the quantity represented by the difunction signal train applied to said first input terminal.

9. A difunction root extractor circuit for generating a difunction output signal train non-numerically representative of a predetermined root of the quantity non-numerically represented by an applied difunction input signal train, said root extractor circuit comprising: 1st . . . *n*th difunction computing elements each including a divisor input terminal, a dividend input terminal and a multiplier input terminal for receiving difunction signal trains, each of said computing elements also including an output terminal and means for producing at said output terminal a difunction output signal non-numerically representative of the quotient of the quantities represented by the difunction signal trains applied to its associated dividend and divisor input terminals multiplied by the quantity represented by the difunction signal train applied to its associated multiplier input terminal; means for intercoupling the output terminal of each of said computing elements except the *n*th to the dividend input terminal of the immediately succeeding computing element; feedback means for intercoupling the output terminal and the divisor input terminal of each computing element; means for applying the input difunction signal train to the dividend input terminal of said 1st computing element; means for applying the output signal generated by said *n*th computing element to the multiplier input terminal of at least one of said computing elements excepting the *n*th computing element; and means for applying a plus one representing difunction signal to the multiplier input terminal of each of the remainder of said computing elements.

10. A difunction root extractor circuit for generating a difunction output signal train corresponding to the *r*th root of the quantity represented by an applied input difunction signal train, said root extractor circuit comprising: 1st . . . Mth square root extractor circuits, where M is defined by the condition:

$$2^M \geq r > 2^{(M-1)}$$

each of said square root extractor circuits including first and second input terminals for receiving difunction signal trains, an output terminal, and means including a feedback loop for presenting at its associated output terminal a difunction signal non-numerically representative of the square root of the product of the quantities represented by the difunction trains applied to its associated first and second input terminals; means for applying the input difunction signal train to the first input terminal of said 1st square root extractor circuit; means for applying the output signals from all square root extractor circuits but the Mth to the first input terminals of the immediately succeeding square root extractor circuits, respectively; means for interconnecting the output terminal of said Mth square root extractor circuit to the second input terminal of the preceding square root extractor circuits in accordance with the equation:

$$2^M - r = N$$

where N is an M-digit binary number whose digits, from the least significant to the most significant, correspond respectively to square root extractor circuits 1 through M, the output terminal of said Mth square root extractor circuit being connected to the second input terminal of those square root circuits whose corresponding digits in the number N have a binary value of one; and means for applying a continuous plus one difunction signal train to the second input terminals of the square root extractor circuits whose corresponding digits in the number N have a binary value of zero.

11. A difunction root extractor circuit for generating a difunction output signal train non-numerically representative of a predetermined root of the quantity non-numerically represented by an applied difunction input signal train, said root extractor circuit comprising: first . . . *n*th difunction computing elements, each having an output terminal, at least one of said computing elements having first and second input terminals for receiving difunction signal trains and means, including a feedback loop, for presenting at its associated output terminal a difunction output signal representative of the square root of the product of the quantities represented by the difunction signals applied to its input terminals, each of the remainder of said computing elements having a first input terminal and means, including a feedback loop, for presenting at its associated output terminal a difunction output signal representative of the square root of the quantity represented by the difunction signal train applied to its associated input terminal; means for interconnecting the output terminals of the first, . . . $(n-1)$th computing elements with the first input terminal of the second, . . . *n*th computing elements; means for applying the input difunction signal train to the first input terminal of said first computing elements; and feedback means for applying to said second input terminal of said one computing element the difunction output signal presented at the output terminal of one of the succeeding computing elements.

12. A difunction root extractor circuit comprising: a difunction computing element having at least first and second input terminals for receiving difunction signal trains, said computing element also having an output terminal, first means including a feedback loop for generating a composite signal numerically representative of the quotient of the quantities non-numerically represented by the difunction signals applied to said first and second input terminals, and second means, coupled to said first means, for presenting at said output terminal a difunction output signal non-numerically representative of a quantity proportional to the quotient represented by said composite signal; means for applying to said first input terminal a difunction signal train to be operated upon; and feedback means for intercoupling said output terminal with said second input terminal.

13. A difunction root extractor circuit comprising: a difunction computing element including first and second input terminals for receiving difunction signal trains, an output terminal, and means for presenting at said output terminal a difunction output signal non-numerically representative of a quantity proportional to the quotient of the quantities represented by the difunction signal trains applied to said first and second terminals; means for applying to said first input terminal a difunction signal train to be operated upon; and feedback means for intercoupling said output terminal with said second input terminal.

14. A difunction root extractor circuit for solving a quadratic equation of the form $AX^2+BX=C$, said root extractor circuit comprising: a difunction computing element having divisor, dividend and multiplier input terminals for receiving difunction signal trains, respectively, said computing element including an output terminal and means for presenting at said output terminal a difunction output signal non-numerically representative of the quotient of the quantities represented by the difunction signal trains applied to said divisor and dividend terminals multiplied by the quantity represented by the difunction signal train applied to said multiplier input terminal; means for applying to said dividend input terminal a difunction signal representative of the coefficient C in the equation to be solved; means for applying to said multiplier terminal a difunction signal representative of the coefficient A in the equation to be solved; and feedback means intercoupling said output terminal with said divisor terminal, said feedback means including computation means for combining said output difunction signal with a difunction signal representative of the coefficient B in the equation to be solved to produce a resultant difunction signal representative of the sum of the quantities represented by the output difunction signal and the coefficient B; and means for applying said resultant signal to said divisor input terminal.

15. A difunction root extractor circuit for solving a polynomial equation of the form $$A_0X^n+A_1X^{n-1} \ . \ . \ . \ A_{n-1}X=A_n$$

said root extractor circuit comprising: a difunction computing element having a divisor input terminal, a dividend input terminal and a multiplier input terminal for receiving difunction signal trains, said difunction computing element including an output terminal and means for presenting at said output terminal a difunction output signal non-numerically representative of the quotient of the quantities represented by the difunction signal trains applied to said divisor and dividend terminals multiplied by the quantity represented by the difunction signal train applied to said multiplier input terminal; means for applying a difunction signal train representative of the coefficient $A_n$ to said dividend input terminal; means for applying a difunction signal train representative of the coefficient $A_0$ to said multiplier input terminal; and feedback means intercoupling said output terminal with said divisor input terminal, said feedback means including means for combining said difunction output signal train with difunction signal trains representative of the coefficients $A_1$ through $A_{(n-1)}$ to produce a resultant difunction signal train representative of the quality $$A_0X^{n-1}+A_1X^{n-2}\ .\ .\ .\ A_{(n-1)}$$

and means for applying said resultant difunction signal to said divisor input terminal.

16. A difunction root extractor circuit for solving a polynomial equation of the form $$A_0X^n+A_1X^{n-1}+\ .\ .\ .\ A_{n-1}X=A_n$$

said root extractor circuit comprising: first cyclically operable storage means including first and second input terminals for receiving difunction signal trains; means for applying an input difunction signal train representative of the coefficient $A_n$ to said first input terminal, said first storage means being operable during each cycle for producing a composite signal representative of the summation of the differences between the signals of the difunction signal train applied to said first input terminal and the corresponding signals applied to said second input terminal; second and third cyclically operable storage means coupled to said first cyclically operable storage means, each of said second and third storage means having an input terminal and being operable during successive cycles for producing at an associated output terminal an output difunction signal train representative of the summation of the products of the signals applied to its associated input terminal and the corresponding composite signal stored in said first storage means; a first feedback loop for applying the difunction output signal from said second storage means to said second input terminal of said first storage means; means for applying an input difunction signal train representative of the coefficient $A_0$ to said input terminal of said third storage means; and a second feedback loop for intercoupling said output terminal of said third storage means to said input terminal of said second storage means, said second feedback loop being also coupled to said first storage means and including means for combining said output difunction signal train from said third storage means with difunction signal trains representative of the coefficients $A_1$ through $A_{(n-1)}$ to produce a resultant difunction signal train representative of the quantity $$A_0X^{n-1}+A_1X^{n-2}+\ .\ .\ .\ A_{(n-1)}$$

where X is the numerical value of the composite signal stored in said first storage means, and means for applying said resultant difunction signal to said input terminal of said second storage means.

17. The difunction root extractor circuit defined in claim 16 wherein said second feedback loop includes: a first difunction adder for combining said output difunction signal train with a difunction signal train representative of the coefficient $A_1$ to produce a sum signal; 1st, . . . $(n-2)$ cascaded sets of difunction computing elements each having first and second input terminals and an output terminal, each of said sets of computing elements including an accumulator coupled to said first storage means and operative under the control of a difunction signal applied to said first terminal of the set for producing at an associated output terminal a difunction signal train representative of the summation of the products of the signals applied to said first terminal of the set and the composite signal stored in said first storage means, each of said sets of computing elements also including a difunction adder having two input terminals and an output terminal constituting the output terminal of the associated set, one input terminal of each adder being connected to said second input terminal of the associated set and the other input terminal being connected to the output terminal of the associated accumulator of the set; means for interconnecting the output terminals of said 1st . . . $(n-3)$ sets to the first input terminal of said 2nd . . . $(n-2)$ sets, respectively; means for applying difunction signal trains representative of the coefficients $A_2$ . . . $A_{(n-1)}$ to the second input terminals of said 1st . . . $(n-2)$ sets, respectively; means for applying the sum signal from said first difunction adder to said first input terminal of said first set of computing elements; and means for intercoupling the output terminal of said $(n-2)$ set to said input terminal of said second storage means.

18. A difunction root extractor circuit comprising: 1st . . . Mth difunction computing elements where M is a predetermined one of the integers 1, 2, 3 . . . etc., each computing element including a divisor input terminal, a dividend input terminal and a multiplier input terminal for receiving applied difunction signal trains, each of said computing elements also including an output terminal and means for producing at said output terminal a difunction output signal train non-numerically representative of the quotient of the quantities represented by difunction signal trains applied to its associated dividend and divisor input terminals multiplied by the quantity represented by a difunction signal train applied to its associated multiplier input terminal, means for intercoupling the output terminal of each of said computing elements except the Mth to the dividend input terminal of the immediately succeeding computing element, and feedback means for intercoupling the output terminal and the divisor input terminal of each of the computing elements.

19. A difunction root extractor circuit comprising: 1st . . . Mth difunction computing elements where M is a predetermined one of the integers 1, 2, 3 . . . etc. each computing element having an output terminal and first and second input terminals for receiving applied difunction signal trains, each computing element including apparatus for combining difunction signal trains applied to said first and second terminals to form at its output terminal a difunction output signal train representative of the result of one of the mathematical operations of multiplication and division of the quantities represented by the applied signal trains; first means for connecting the output terminal of each computing element to the first input terminal of the succeeding computing element; second means for applying a difunction signal train to the first input terminal of the first computing element; and feedback means for intercoupling the output terminal of the Mth computing element to one of said second input terminals.

References Cited in the file of this patent

FOREIGN PATENTS

| | | |
|---|---|---|
| 1,055,460 | France | Oct. 14, 1953 |
| 1,094,570 | France | Dec. 18, 1954 |

OTHER REFERENCES

"Electronic Computers For Division, Multiplication, Squaring, Etc. by National Defense Research Committee (NDRC) Cornell University. Declassified April 2, 1946. Pages 2, 22, 24, 29–42 and 47–49 relied on.

Broomall et al.: "A Sampling Analogue Computer," Proceeding of IRE, May 1952. Pp. 568–572.

Meyer: "Digital Techniques in Analog Systems," IRE Transactions, Electronic Computers. June 1954. Pages 23–29. Page 27 of particular interest.